United States Patent
Nishiyama et al.

(10) Patent No.: US 10,014,548 B2
(45) Date of Patent: Jul. 3, 2018

(54) FUEL CELL

(71) Applicant: HONDA MOTOR CO., LTD., Tokyo (JP)

(72) Inventors: Tadashi Nishiyama, Sakura (JP); Shuhei Goto, Utsunomiya (JP); Yusuke Okabe, Utsunomiya (JP); Kentaro Ishida, Utsunomiya (JP)

(73) Assignee: HONDA MOTOR CO., LTD., Tokyo (JP)

(*) Notice: Subject to any disclaimer, the term of this patent is extended or adjusted under 35 U.S.C. 154(b) by 305 days.

(21) Appl. No.: 14/096,105

(22) Filed: Dec. 4, 2013

(65) Prior Publication Data
US 2014/0227622 A1 Aug. 14, 2014

(30) Foreign Application Priority Data

Dec. 7, 2012 (JP) ................................ 2012-268247
May 20, 2013 (JP) ................................ 2013-105732

(51) Int. Cl.
| | | |
|---|---|---|
| H01M 8/24 | (2016.01) | |
| H01M 8/242 | (2016.01) | |
| H01M 8/0206 | (2016.01) | |
| H01M 8/0273 | (2016.01) | |
| H01M 8/0284 | (2016.01) | |

(Continued)

(52) U.S. Cl.
CPC ......... *H01M 8/242* (2013.01); *H01M 8/0206* (2013.01); *H01M 8/0273* (2013.01); *H01M 8/0284* (2013.01); *H01M 8/0297* (2013.01); *H01M 2008/1095* (2013.01)

(58) Field of Classification Search
CPC .... H01M 8/0206; H01M 8/0232; H01M 8/10; H01M 8/242
USPC ......................................................... 429/463
See application file for complete search history.

(56) References Cited

U.S. PATENT DOCUMENTS 7,297,428 B2  11/2007  Saulsbury et al.
2006/0051625 A1*  3/2006  Jeon ................... H01M 8/0273
429/437

(Continued)

FOREIGN PATENT DOCUMENTS

JP  2005-166597 A  6/2005
JP  2005243354 A *  9/2005

(Continued)

OTHER PUBLICATIONS

English translation of Inui, Fumihiko, JP 2007026737 A, Feb. 2007, Japan.*

(Continued)

*Primary Examiner* — Mark F Huff
*Assistant Examiner* — Rashid Alam
(74) *Attorney, Agent, or Firm* — Squire Patton Boggs (US) LLP (57) ABSTRACT

A fuel cell includes a power generation unit. A first resin frame member is provided in an outer portion of a first membrane electrode assembly of the power generation unit. The first metal separator has a heating portion subjected to spot heating from a surface of the first metal separator for allowing the first resin frame member to be melted partially. The first metal separator and the first membrane electrode assembly are welded together by a plurality of welding portions to form a first structural body.

4 Claims, 11 Drawing Sheets

(51) Int. Cl.
*H01M 8/0297* (2016.01)
*H01M 8/1018* (2016.01)

(56) References Cited

U.S. PATENT DOCUMENTS

| | | | |
|---|---|---|---|
| 2006/0073373 A1* | 4/2006 | Andrin | H01M 8/0247 |
| | | | 429/483 |
| 2009/0004537 A1 | 1/2009 | Yagami et al. | |
| 2009/0004539 A1* | 1/2009 | Ishikawa | H01M 8/0273 |
| | | | 429/434 |
| 2009/0068513 A1* | 3/2009 | Shirahama | H01M 8/0271 |
| | | | 429/431 |
| 2010/0297525 A1* | 11/2010 | Fukuta | H01M 8/0276 |
| | | | 429/483 |
| 2013/0115541 A1 | 5/2013 | Oku et al. | |

FOREIGN PATENT DOCUMENTS

| | | | |
|---|---|---|---|
| JP | 2007026737 A * | 2/2007 | |
| JP | 2007-066573 A | 3/2007 | |
| JP | 2009-099311 A | 5/2009 | |
| JP | 2010-040487 A | 2/2010 | |
| JP | 4516279 B2 | 8/2010 | |
| JP | 4951974 B2 | 3/2012 | |
| JP | 2013-012324 A | 1/2013 | |
| JP | 5114899 B2 | 1/2013 | |
| JP | 5233310 B2 | 7/2013 | |
| WO | WO2011/152405 A1 | 12/2011 | |

OTHER PUBLICATIONS

English translation of Miyagawa JP 2005243354 A, Sep. 2005, Japan.*

* cited by examiner

FUEL CELL

CROSS-REFERENCE TO RELATED APPLICATIONS

This application is based upon and claims the benefit of priority from Japanese Patent Applications No. 2012-268247 filed on Dec. 7, 2012 and No. 2013-105732 filed on May 20, 2013, the contents all of which are incorporated herein by reference.

BACKGROUND OF THE INVENTION

Field of the Invention

The present invention relates to a fuel cell formed by stacking a membrane electrode assembly and a metal separator. The membrane electrode assembly includes a pair of electrodes and an electrolyte membrane interposed between the electrodes. A resin frame member is provided in an outer portion of the membrane electrode assembly.

Description of the Related Art

For example, a solid polymer electrolyte fuel cell employs a membrane electrode assembly (MEA) which includes a solid polymer electrolyte membrane, an anode provided on one side of the solid polymer electrolyte membrane, and a cathode provided on the other side of the solid polymer electrolyte membrane. The electrolyte membrane is a polymer ion exchange membrane. The membrane electrode assembly is sandwiched between separators to form a power generation cell (unit cell). Generally, several tens to hundreds of unit cells are stacked together to from a fuel cell stack, e.g., for use in a vehicle.

In most cases, in order to supply a fuel gas and an oxygen-containing gas as reactant gases to the anode and the cathode of each of the stacked power generation cells, the fuel cell have so-called internal manifold structure. Therefore, for example, in order to achieve the desired sealing performance for preventing leakage of reactant gases, it is required to position and assemble the membrane electrode assembly and the separators accurately.

In this regard, for example, a fuel cell disclosed in Japanese Patent No. 4516279 is known. In the fuel cell, a gas diffusion layer of one of the electrodes of the membrane electrode assembly covers the entire surface of the electrolyte membrane, and a gas diffusion layer of the other of the electrodes of the membrane electrode assembly has a small surface size in comparison with the electrolyte membrane. A plurality of ridges for positioning the gas diffusion layer of the one of the electrodes and the outer end of the electrolyte membrane are present in a seal member provided integrally with the separator, and the ridges are spaced from one another.

Therefore, simply by engaging the membrane electrode assembly with the ridges of the separator, the membrane electrode assembly can be positioned relative to the separator accurately and easily.

SUMMARY OF THE INVENTION

In this technical field, reduction in the thickness of the solid polymer electrolyte membrane has been attempted to reduce the amount of relatively expensive material used for the solid polymer electrolyte membrane. Therefore, in order to protect the thin solid polymer electrolyte membrane having low strength, as a protection member, for example, a frame equipped MEA including a resin frame member has been adopted. However, warpage tends to occur in the resin frame member. Therefore, at the time of engaging the resin frame member with the ridges for positioning of the separator, or at the time of stacking components of the fuel cell, positional displacement of the membrane electrode assembly occurs.

The present invention has been made to solve the problem of this type, and an object of the present invention is to provide a fuel cell having simple and economical structure in which it is possible to position a membrane electrode assembly and a metal separator accurately and easily, and suppress positional displacement among components as much as possible.

The present invention relates to a fuel cell formed by stacking a membrane electrode assembly and a metal separator. The membrane electrode assembly includes electrodes and an electrolyte membrane interposed between the electrodes. A resin frame member is provided in an outer portion of the membrane electrode assembly.

In the fuel cell, the metal separator has a heating portion subjected to spot heating from a surface opposite to a contact surface of the metal separator which contacts the resin frame member, for partially melting the resin frame member to weld the metal separator and the resin frame member together. Further, the fuel cell includes a structural body formed by combining the metal separator and the membrane electrode assembly together.

In the present invention, in a state where the metal separator and the membrane electrode assembly are stacked together, spot heating is applied to the heating portion of the metal separator. Therefore, the resin frame member is partially melted to weld the metal separator and the resin frame member together. Accordingly, even if warpage occurs in the resin frame member, the resin frame member can be fixed to the metal separator reliably.

Thus, with simple and economical structure, the membrane electrode assembly and the metal separator can be positioned relative to each other accurately and easily. Accordingly, it becomes possible to suppress relative displacement among the components as much as possible.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
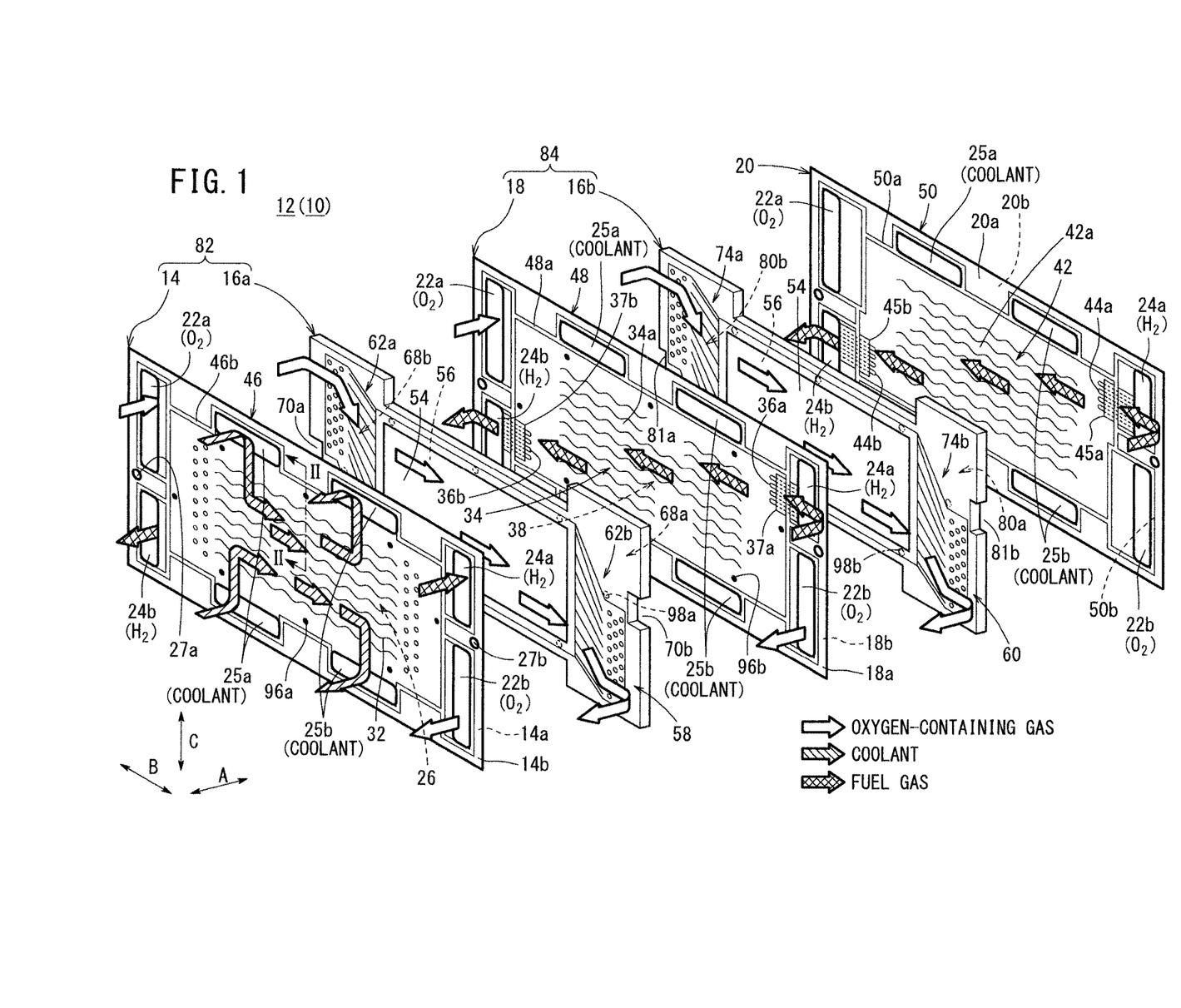
FIG. 1 is an exploded perspective view showing main components of a power generation unit of a fuel cell according to a first embodiment of the present invention.
Figure 2:
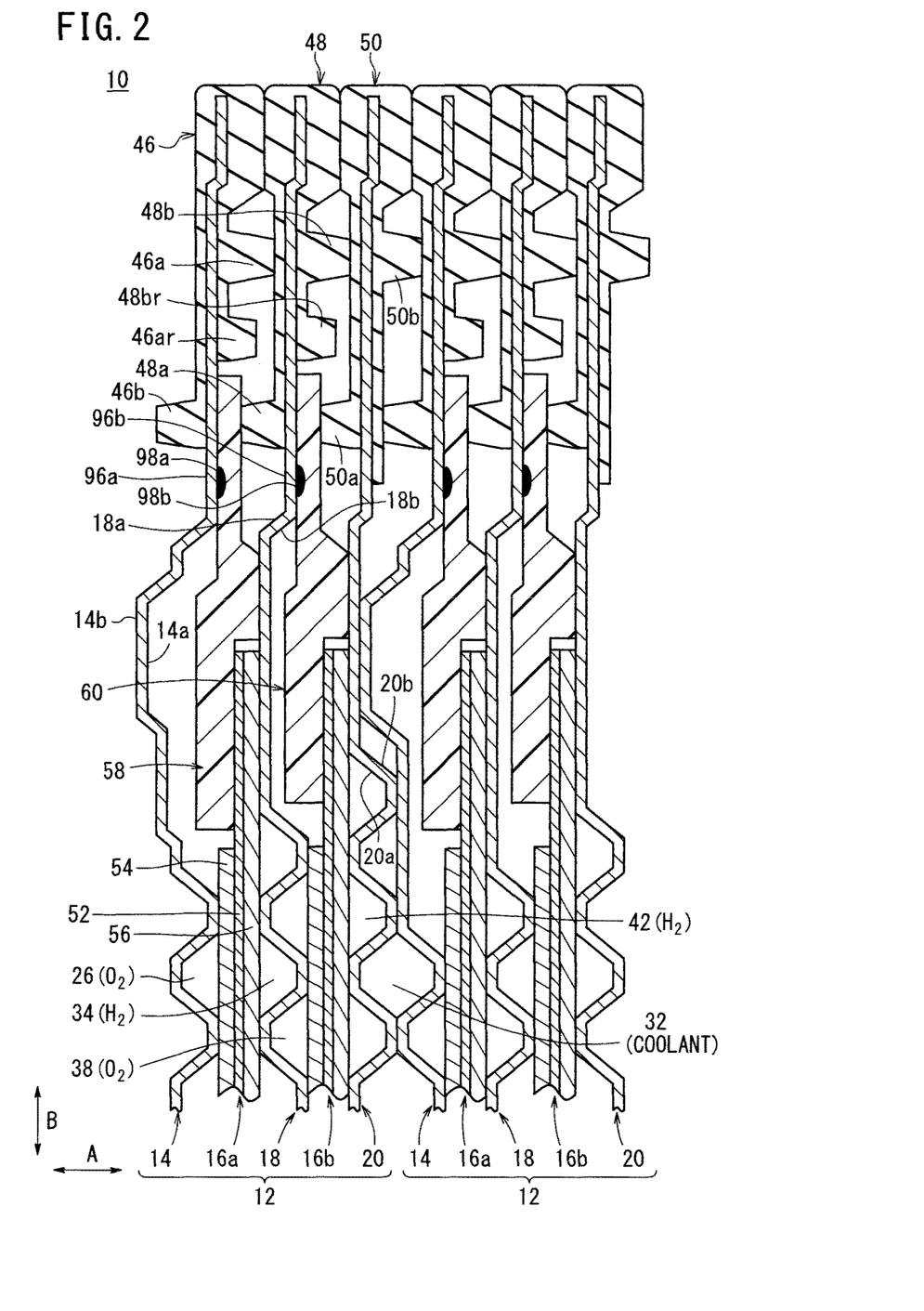
FIG. 2 is a cross sectional view showing the power generation unit, taken along a line II-II in FIG. 1.

As shown in FIGS. 1 and 2, a fuel cell 10 according to a first embodiment of the present invention includes a power generation unit 12. A plurality of power generation units 12 are stacked together in a horizontal direction indicated by an arrow A or in a vertical direction indicated by an arrow C to form a fuel cell stack. For example, the fuel cell stack is mounted in a fuel cell electric automobile (not shown).

The power generation unit 12 includes a first metal separator 14, a first membrane electrode assembly 16a, a second metal separator 18, a second membrane electrode assembly 16b, and a third metal separator 20.

For example, the first metal separator 14, the second metal separator 18, and the third metal separator 20 are made of oblong metal plates such as steel plates, stainless steel plates, aluminum plates, plated steel sheets, or metal plates having anti-corrosive surfaces by surface treatment. For example, the first metal separator 14, the second metal separator 18, and the third metal separator 20 have rectangular planar surfaces, and are formed by corrugating metal thin plates by press forming to have a corrugated shape in cross section and a wavy or serpentine shape on the surface.

As shown in FIG. 1, at one end of a power generation unit 12 in a longitudinal direction indicated by an arrow B, an oxygen-containing gas supply passage 22a and a fuel gas discharge passage 24b are provided. The oxygen-containing gas supply passage 22a and the fuel gas discharge passage 24b extend through the power generation unit 12 in the direction indicated by the arrow A. Specifically, the oxygen-containing gas supply passage 22a and the fuel gas discharge passage 24b are provided at one end of the first metal separator 14, the second metal separator 18, and the third metal separator 20 in the longitudinal direction. The oxygen-containing gas supply passage 22a supplies an oxygen-containing gas, and the fuel gas discharge passage 24b discharges a fuel gas such as a hydrogen-containing gas.

At the other end of the power generation unit 12 in the longitudinal direction indicated by the arrow B, a fuel gas supply passage 24a for supplying the fuel gas and an oxygen-containing gas discharge passage 22b for discharging the oxygen-containing gas are provided. The fuel gas supply passage 24a and the oxygen-containing gas discharge passage 22b extend through the power generation unit 12 in the direction indicated by the arrow A.

At both ends of the power generation unit 12 in a lateral direction indicated by the arrow C, a pair of coolant supply passages 25a for supplying a coolant is provided on a side closer to the oxygen-containing gas supply passage 22a. At both ends of the power generation unit 12 in the lateral direction, a pair of coolant discharge passages 25b for discharging the coolant is provided on a side closer to the fuel gas supply passage 24a. The coolant supply passages 25a and the coolant discharge passages 25b extend through the power generation unit 12 in the direction indicated by the arrow A.

At one end, and at the other end of the power generation unit 12 in the longitudinal direction, knock holes 27a, 27b are formed, respectively, at substantially central positions in the direction indicated by the arrow C. Resin knock pins (not shown) are inserted into knock holes 27a, 27b to position the first metal separator 14, the second metal separator 18, and the third metal separator 20 within the power generation unit 12.

Figure 3:
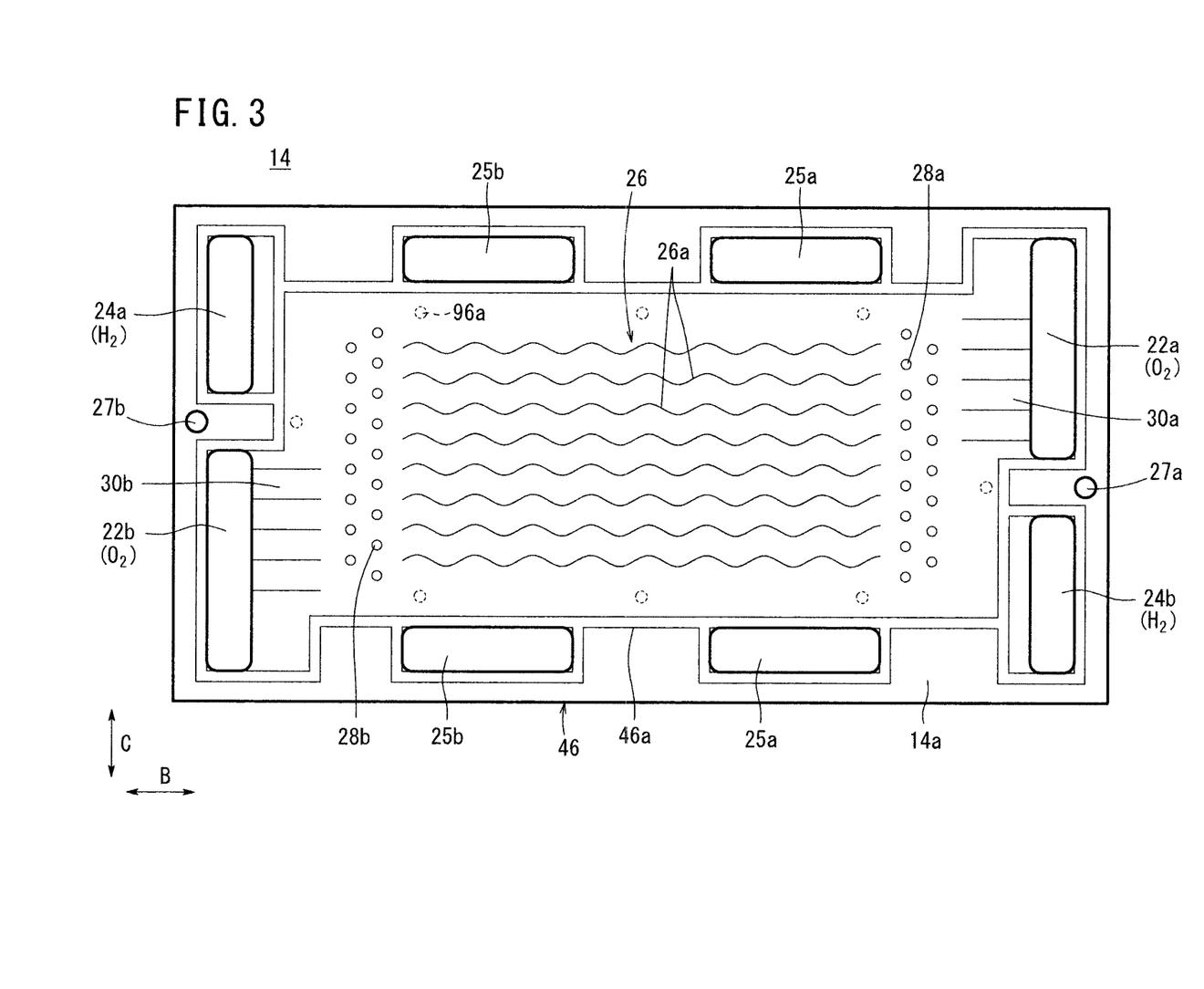
FIG. 3 is a front view showing a first metal separator of the power generation unit.

As shown in FIG. 3, the first metal separator 14 has a first oxygen-containing gas flow field 26 on its surface 14a facing the first membrane electrode assembly 16a. The first oxygen-containing gas flow field 26 is connected to the oxygen-containing gas supply passage 22a and the oxygen-containing gas discharge passage 22b.

The first oxygen-containing gas flow field 26 includes a plurality of corrugated and wavy flow grooves (or straight flow grooves) 26a extending in the direction indicated by the arrow B. A plurality of inlet bosses 28a are provided at the inlet of the first oxygen-containing gas flow field 26, and a plurality of outlet bosses 28b are provided at the outlet of the first oxygen-containing gas flow field 26.

A plurality of inlet connection grooves 30a as part of a bridge section are formed between the inlet bosses 28a and the oxygen-containing gas supply passage 22a, and a plurality of outlet connection grooves 30b as part of a bridge section are formed between the outlet bosses 28b and the oxygen-containing gas discharge passage 22b.

As shown in FIG. 1, a coolant flow field 32 is formed on a surface 14b of the first metal separator 14. The coolant flow field 32 is connected to the pair of coolant supply passages 25a and the pair of coolant discharge passages 25b. The coolant flow field 32 is formed by stacking the back surface of the first oxygen-containing gas flow field 26 and the back surface of a second fuel gas flow field 42 described later.

The second metal separator 18 has a first fuel gas flow field 34 on its surface 18a facing the first membrane electrode assembly 16a. The first fuel gas flow field 34 is connected to the fuel gas supply passage 24a and the fuel gas discharge passage 24b. The first fuel gas flow field 34 includes a plurality of corrugated and wavy flow grooves (or straight flow grooves) 34a extending in the direction indicated by the arrow B.

A plurality of supply flow grooves 36a connecting the fuel gas supply passage 24a and the first fuel gas flow field 34 are formed adjacent to the fuel gas supply passage 24a. The supply flow grooves 36a are covered by a lid member 37a. A plurality of discharge flow grooves 36b connecting the fuel gas discharge passage 24b and the first fuel gas flow field 34 are formed adjacent to the fuel gas discharge passage 24b. The discharge flow grooves 36b are covered by a lid member 37b.

Figure 4:
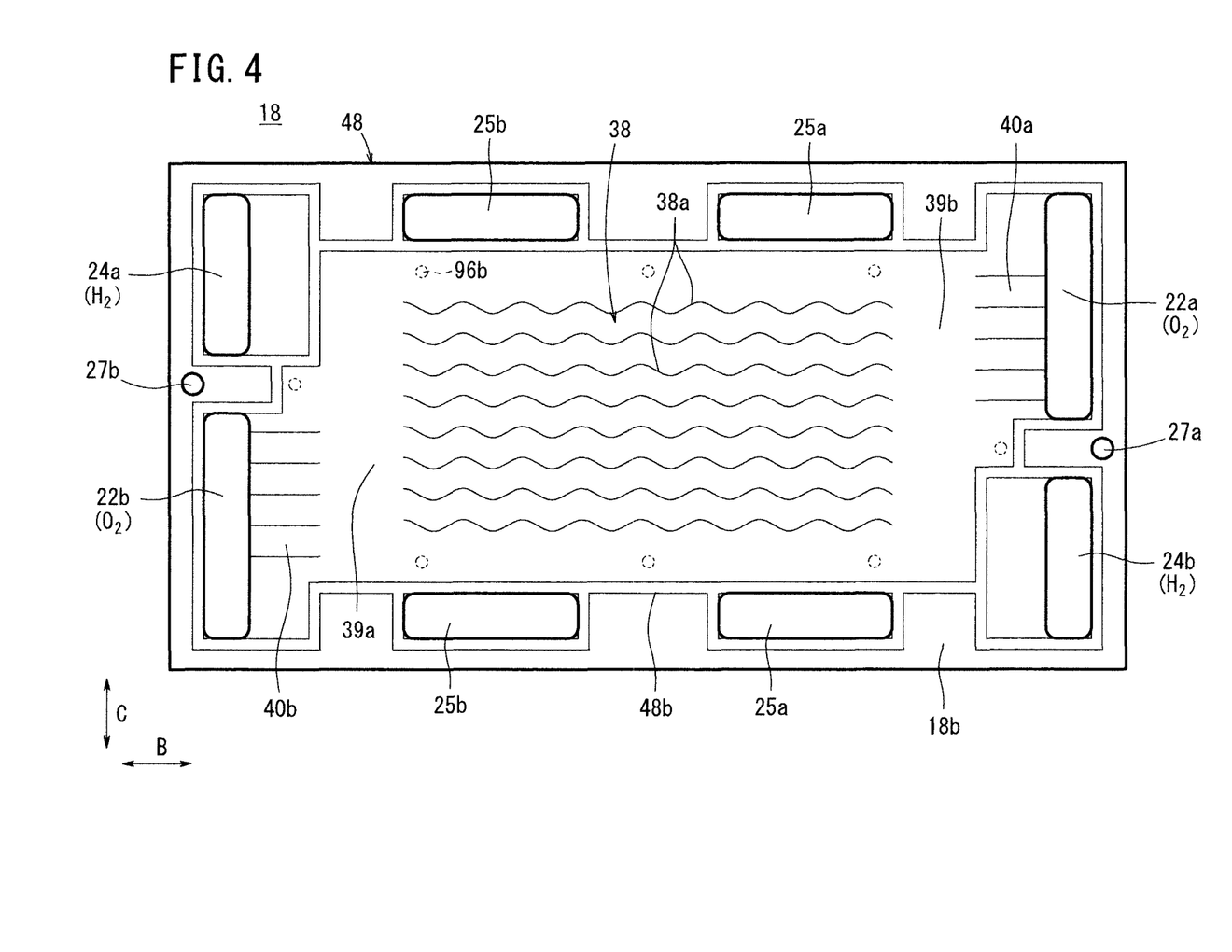
FIG. 4 is a front view showing a second metal separator of the power generation unit.

As shown in FIG. 4, the second metal separator 18 has a second oxygen-containing gas flow field 38 on its surface 18b facing the second membrane electrode assembly 16b. The second oxygen-containing gas flow field 38 is connected to the oxygen-containing gas supply passage 22a and the oxygen-containing gas discharge passage 22b. The second oxygen-containing gas flow field 38 includes corrugated and wavy flow grooves (or straight flow grooves) extending in the direction indicated by the arrow B.

As shown in FIG. 1, the third metal separator 20 has the second fuel gas flow field 42 on its surface 20a facing the second membrane electrode assembly 16b. The second fuel gas flow field 42 is connected to the fuel gas supply passage 24a and the fuel gas discharge passage 24b. The second fuel gas flow field 42 includes a plurality of corrugated and wavy flow grooves (or straight flow grooves) 42a extending in the direction indicated by the arrow B.

A plurality of supply flow grooves 44a connecting the fuel gas supply passage 24a and the second fuel gas flow field 42 are formed adjacent to the fuel gas supply passage 24a. The supply flow grooves 44a are covered by a lid member 45a. A plurality of discharge flow grooves 44b connecting the fuel gas discharge passage 24b and the second fuel gas flow field 42 are formed adjacent to the fuel gas discharge passage 24b. The discharge flow grooves 44b are covered by a lid member 45b.

The coolant flow field 32 is partially formed on a surface 20b of the third metal separator 20, on the back surface of the second fuel gas flow field 42. The surface 20b of the third metal separator 20 is stacked on the surface 14b of the first metal separator 14 adjacent to the third metal separator 20 to form the coolant flow field 32 between the third metal separator 20 and the first metal separator 14.

A first seal member 46 is formed integrally with the surfaces 14a, 14b of the first metal separator 14, around the outer end of the first metal separator 14. A second seal member 48 is formed integrally with the surfaces 18a, 18b of the second metal separator 18, around the outer end of the second metal separator 18. A third seal member 50 is formed integrally with the surfaces 20a, 20b of the third metal separator 20, around the outer end of the third metal separator 20.

Each of the first seal member 46, the second seal members 48, and the third seal member 50 is made of seal material, cushion material, or packing material such as an EPDM (ethylene propylene diene monomer) rubber, an NBR (nitrile butadiene rubber), a fluoro rubber, a silicone rubber, a fluorosilicone rubber, a butyl rubber, a natural rubber, a styrene rubber, a chloroprene rubber, or an acrylic rubber.

As shown in FIG. 3, the first seal member 46 includes a first ridge seal 46a on the surface 14a of the first metal separator 14. The first ridge seal 46a surrounds the oxygen-containing gas supply passage 22a, the oxygen-containing gas discharge passage 22b, and the first oxygen-containing gas flow field 26. As shown in FIG. 2, when the first metal separator 14 and the second metal separator 18 are stacked together such that the first membrane electrode assembly 16a is sandwiched between the first metal separator 14 and the second metal separator 18, the first ridge seal 46a contacts the second seal member 48 of the second metal separator 18. The first ridge seal 46a forms an outer seal member provided outside a first resin frame member 58 described later.

A positioning rib 46ar is formed integrally with the first seal member 46, on the surface 14a of the first metal separator 14. The positioning rib 46ar has a function of positioning the first membrane electrode assembly 16a and the first metal separator 14 relative to each other. The positioning rib 46ar is provided as necessary.

As shown in FIG. 1, the first seal member 46 includes a second ridge seal 46b on the surface 14b of the first metal separator 14. The second ridge seal 46b surrounds the coolant supply passage 25a, the coolant discharge passage 25b, and the coolant flow field 32.

The second seal member 48 includes a first ridge seal 48a on the surface 18a of the second metal separator 18. The first ridge seal 48a surrounds the first fuel gas flow field 34. As shown in FIG. 2, the first ridge seal 48a forms an inner seal member which contacts the first resin frame member 58 of the first membrane electrode assembly 16a adjacent to the second metal separator 18.

As shown in FIG. 4, the second seal member 48 includes a second ridge seal 48b on the surface 18b of the second metal separator 18. The second ridge seal 48b surrounds the oxygen-containing gas supply passage 22a, the oxygen-containing gas discharge passage 22b, and the second oxygen-containing gas flow field 38. As shown in FIG. 2, when the second metal separator 18 and the third metal separator 20 are stacked together such that the second membrane electrode assembly 16b is sandwiched the between the second metal separator 18 and the third metal separator 20, the second ridge seal 48b contacts the third seal member 50 of the third metal separator 20. The second ridge seal 48b forms an outer seal member provided outside a second resin frame member 60 described later.

A positioning rib 48br is formed integrally with the second seal member 48, on the surface 18b of the second metal separator 18. The positioning rib 48br has a function of positioning the second membrane electrode assembly 16b and the second metal separator 18 relative to each other. The positioning rib 48br is provided as necessary.

As shown in FIG. 1, the third seal member 50 includes a first ridge seal 50a on the surface 20a of the third metal separator 20. The first ridge seal 50a surrounds the fuel gas flow field 42. As shown in FIG. 2, the first ridge seal 50a forms an inner seal member which contacts the second resin frame member 60 of the second membrane electrode assembly 16b adjacent to the third metal separator 20.

The third seal member 50 includes a second ridge seal (outer seal member) 50b on the surface 20b of the third metal separator 20. The second ridge seal 50b surrounds the coolant supply passage 25a, the coolant discharge passage 25b, and the coolant flow field 32.

Each of the first membrane electrode assembly 16a and the second membrane electrode assembly 16b includes a solid polymer electrolyte membrane 52, and a cathode 54 and an anode 56 sandwiching the solid polymer electrolyte membrane 52. The solid polymer electrolyte membrane 52 is formed by impregnating a thin membrane of perfluorosulfonic acid with water, for example. The plane size (surface size) of the cathode 54 is smaller than the plane sizes (surface sizes) of the anode 56 and the solid polymer electrolyte membrane 52 (stepped MEA).

The cathode 54, the anode 56, and the solid polymer electrolyte membrane 52 may have the same surface size. Further, the surface size of the anode 56 may be smaller than the surface sizes of the cathode 54 and the solid polymer electrolyte membrane 52.

Each of the cathode 54 and the anode 56 has a gas diffusion layer (not shown) such as a carbon paper, and an electrode catalyst layer (not shown) of porous carbon particles supporting platinum alloy thereon. The carbon particles are deposited uniformly on the surface of the gas diffusion layer. For example, the electrode catalyst layer of the cathode 54 and the electrode catalyst layer of the anode 56 are fixed to both surfaces of the solid polymer electrolyte membrane 52, respectively.

In the first membrane electrode assembly 16a, the first resin frame member 58, which is provided outside the outer end of the cathode 54, is formed integrally with the outer marginal portion of the solid polymer electrolyte membrane 52, e.g., by injection molding. In the second membrane electrode assembly 16b, the second resin frame member 60, which is provided outside the outer end of the cathode 54, is formed integrally with the outer marginal portion of the solid polymer electrolyte membrane 52, e.g., by injection molding.

The first resin frame member 58 and the second resin frame member 60 may be formed as separate members, and joined to the first membrane electrode assembly 16a and the second membrane electrode assembly 16b by adhesive or the like. As the resin material of the first resin frame member 58 and the second resin frame member 60, for example, in addition to general purpose plastic, engineering plastic, super engineering plastic or the like is adopted.

Figure 5:
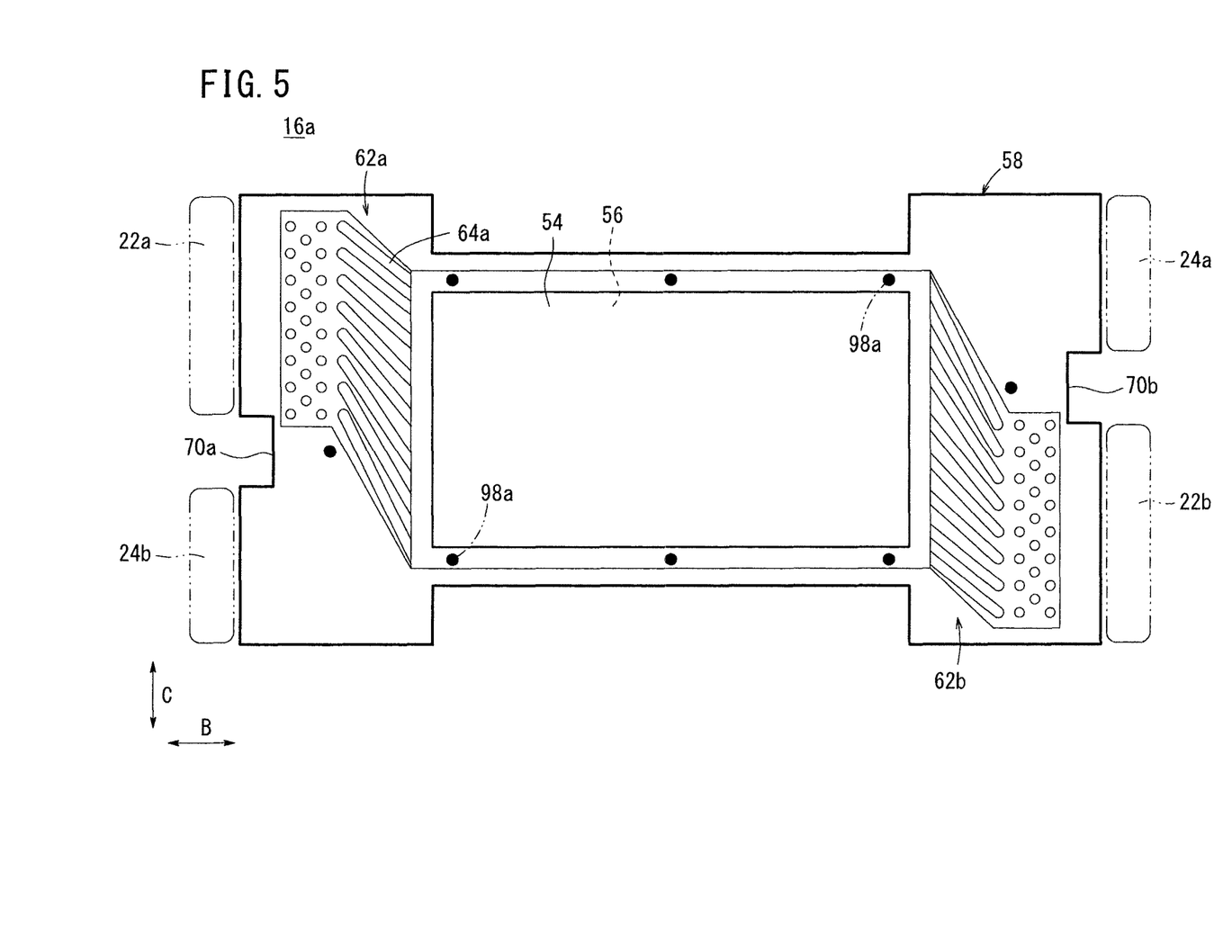
FIG. 5 is a view showing one surface of a first membrane electrode assembly of the power generation unit.

As shown in FIGS. 1 and 5, an inlet buffer 62a is provided on a surface of the first resin frame member 58 facing the cathode 54, between the oxygen-containing gas supply passage 22a and the inlet side of the first oxygen-containing gas flow field 26. An outlet buffer 62b is provided on the surface of the first resin frame member 58 between the oxygen-containing gas discharge passage 22b and the outlet side of the first oxygen-containing gas flow field 26. A plurality of straight ridges and bosses are formed in each of the inlet buffer 62a and the outlet buffer 62b. Buffers described later have the same structure.

Figure 6:
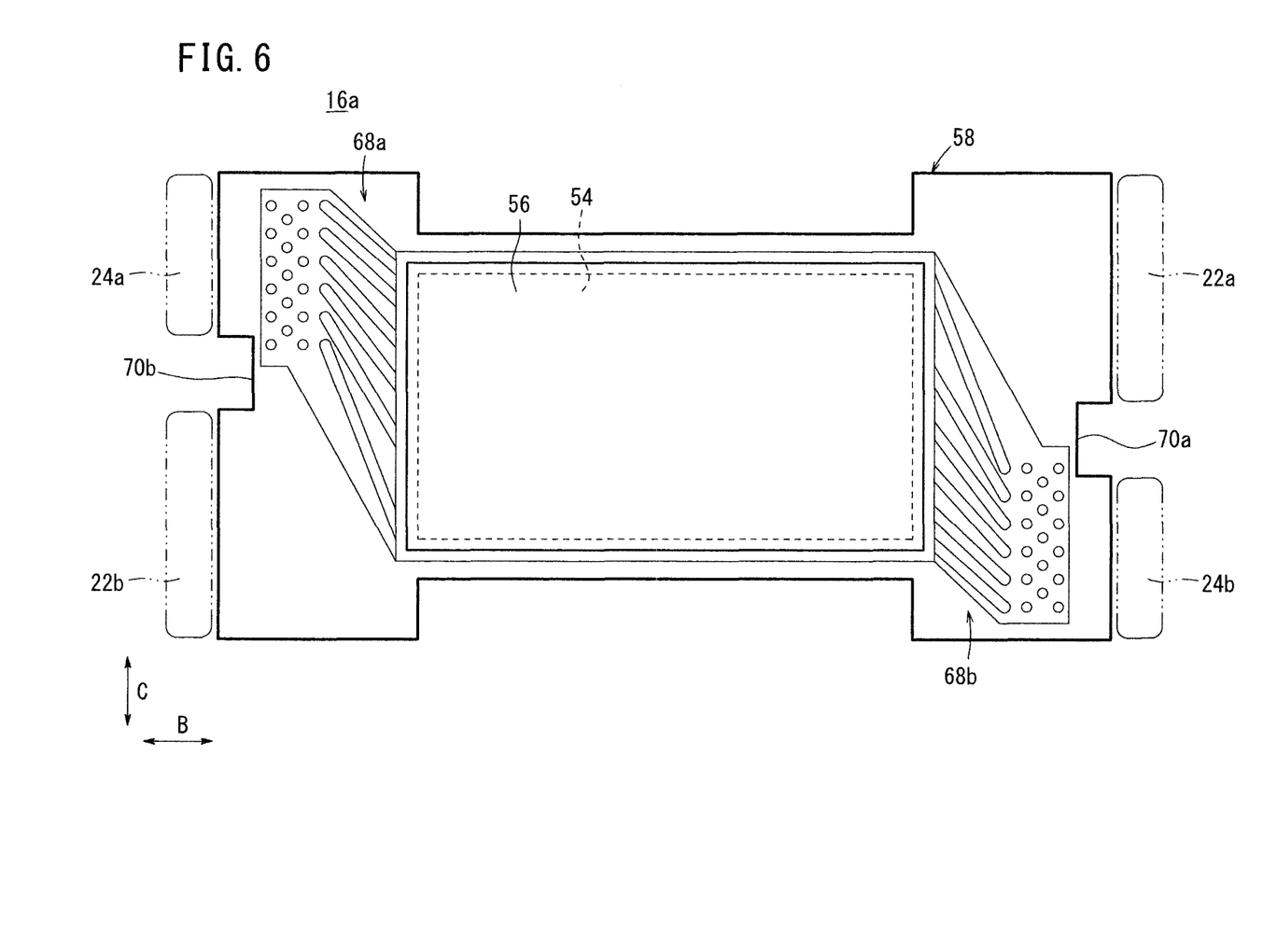
FIG. 6 is a view showing the other surface of the first membrane electrode assembly.

As shown in FIG. 6, an inlet buffer 68a is provided on a surface of the first resin frame member 58 facing the anode 56, between the fuel gas supply passage 24a and the first fuel gas flow field 34. An outlet buffer 68b is provided on the surface of the first resin frame member 58, between the fuel gas discharge passage 24b and the first fuel gas flow field 34. Cutouts 70a, 70b for inserting the knock pins are formed at both ends of the first resin frame member 58 in the direction indicated by the arrow B.

Figure 7:
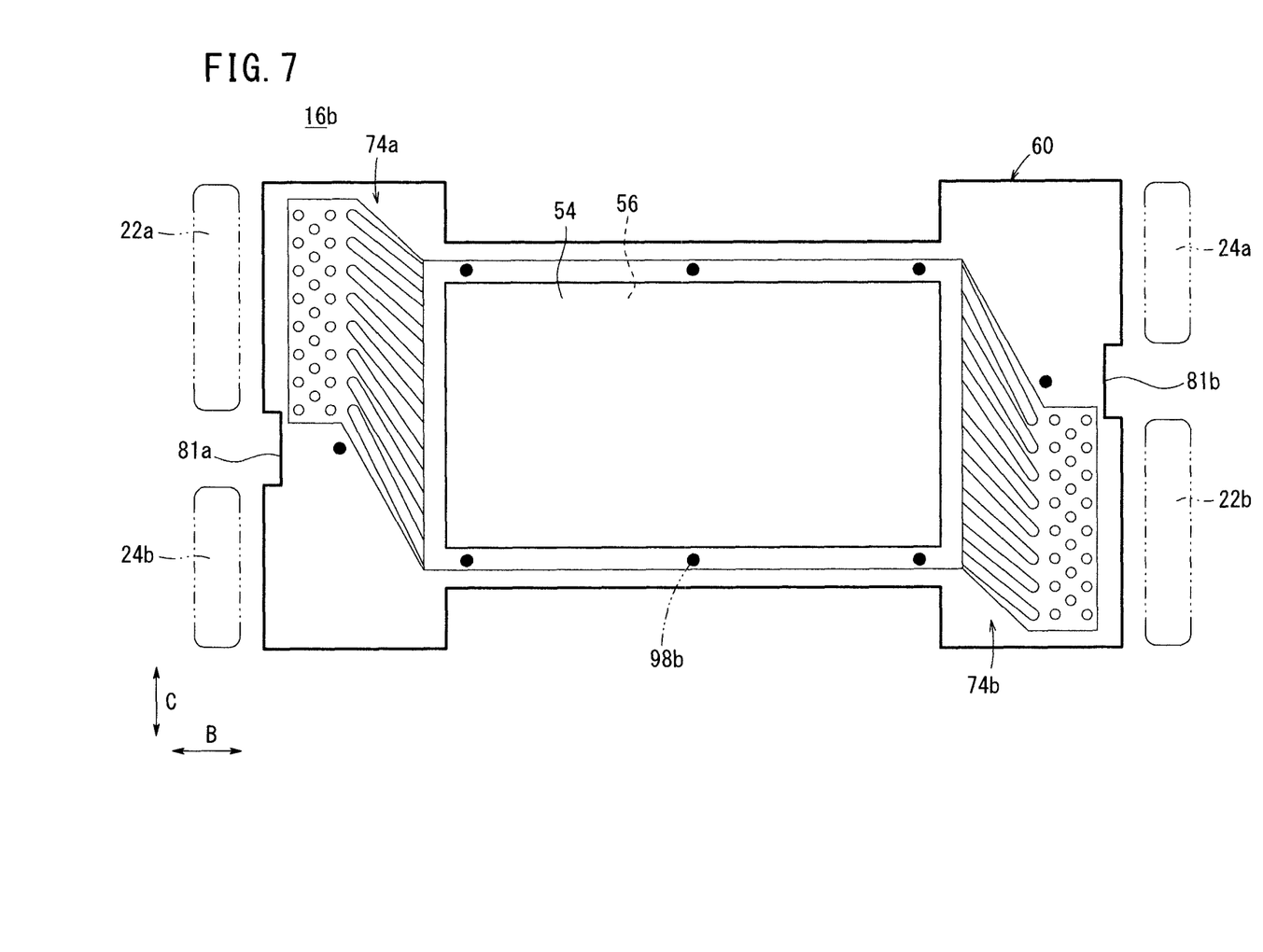
FIG. 7 is a view showing one surface of a second membrane electrode assembly of the power generation unit.

As shown in FIGS. 1 and 7, an inlet buffer 74a is provided on a surface of the second resin frame member 60 facing the cathode 54, between the oxygen-containing gas supply passage 22a and the second oxygen-containing gas flow field 38. An outlet buffer 74b is provided on the surface of the second resin frame member 60 between the oxygen-containing gas discharge passage 22b and the second oxygen-containing gas flow field 38.

Figure 8:
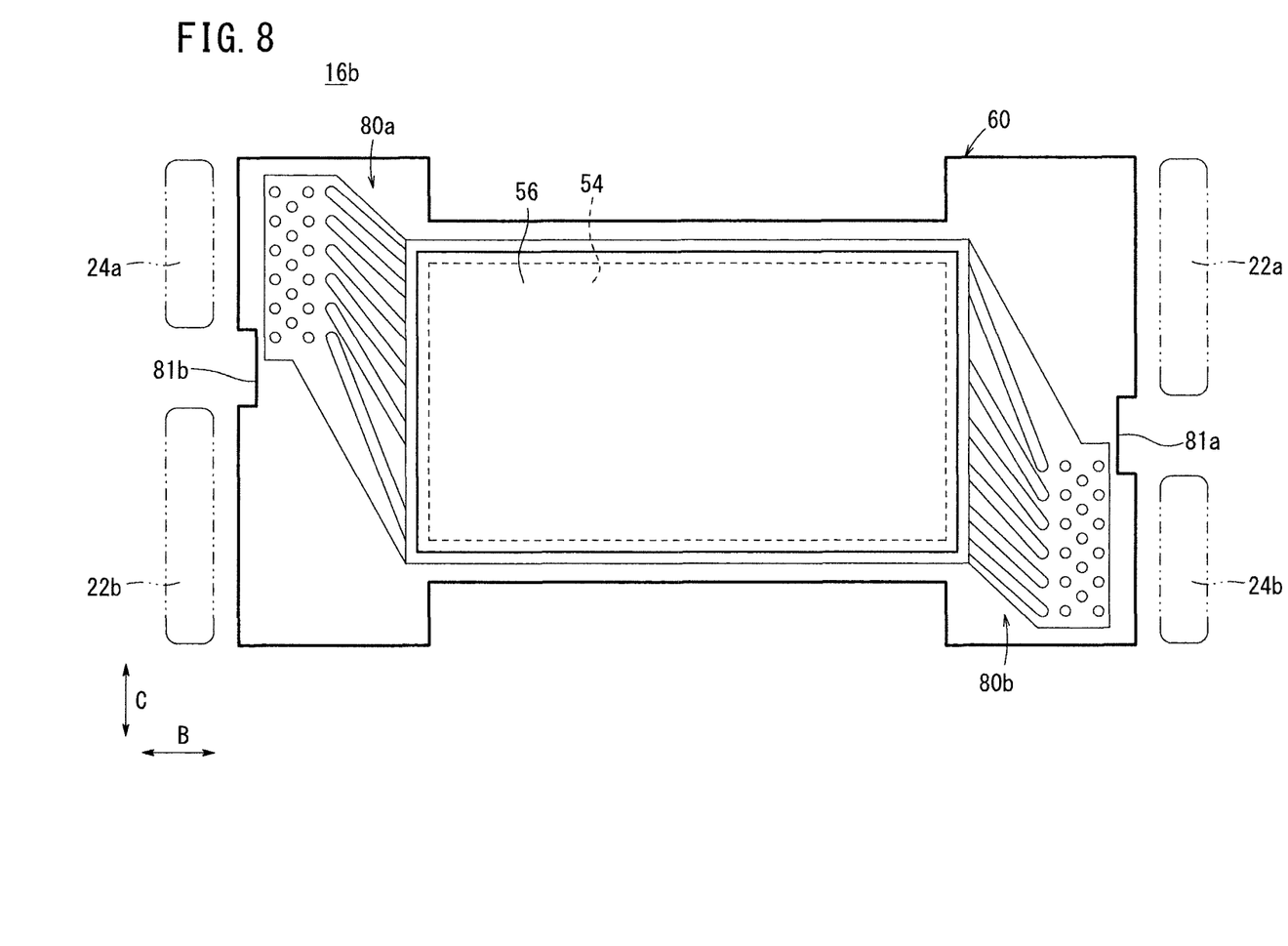
FIG. 8 is a view showing the other surface of the second membrane electrode assembly.

As shown in FIG. 8, an inlet buffer 80a is provided on a surface of the second resin frame member 60 facing the anode 56, between the fuel gas supply passage 24a and the second fuel gas flow field 42. An outlet buffer 80b is provided on the surface of the second resin frame member 60 between the fuel gas discharge passage 24b and the second fuel gas flow field 42. Cutouts 81a, 81b for inserting the knock pins are formed at both ends of the second resin frame member 60 in the direction indicated by the arrow B.

When the power generation units 12 are stacked together, the coolant flow field 32 is formed between the first metal separator 14 of one of the adjacent power generation units 12 and the third metal separator 20 of the other of the adjacent power generation units 12.

In the first embodiment, the power generation unit 12 is formed by stacking a first structural body 82, a second structural body 84, and a third metal separator 20. The first structural body 82 is formed by welding the first metal separator 14 and the first membrane electrode assembly 16a together, and the second structural body 84 is formed by welding the second metal separator 18 and the second membrane electrode assembly 16b together.

Operation of producing the power generation unit 12 will be described below.

Figure 9:
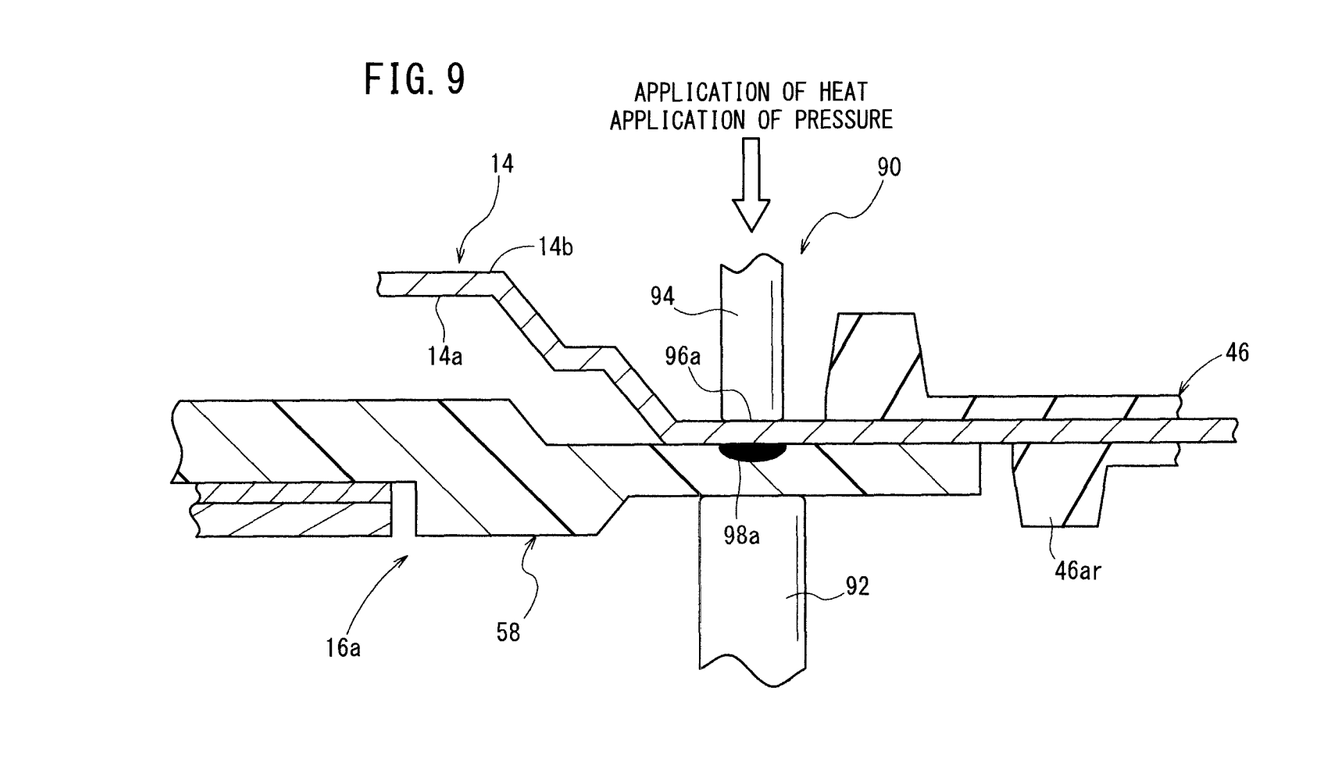
FIG. 9 is a view showing a state where the first metal separator and a first resin frame member of the first membrane electrode assembly are welded together by a heating device.

As shown in FIG. 9, the first metal separator 14 and the first membrane electrode assembly 16a are welded together by a heating device 90. The heating device 90 includes a base 92 and a heating rod 94 heated by an electric heater (not shown). The contact surface of the base 92 which contacts the first resin frame member 58 has a flat shape. Preferably, the contact surface of the heating rod 94 which contacts the first metal separator 14 has a flat shape. Alternatively, the front end of the heating rod 94 may have a smooth rounded shape. For example, the surface area of the contact surface of the base 92 is larger than the surface area of the contact surface of the heating rod 94.

Instead of the heating device 90, for example, any of various heating devices such as a laser heating device (not shown) may be used for direct spot heating of the first metal separator 14.

The first resin frame member 58 of the first membrane electrode assembly 16a is placed on the base 92, and the first metal separator 14 is placed on the first resin frame member 58. The first metal separator 14 is positioned relative to the first membrane electrode assembly 16a by the positioning rib 46ar. Preferably, spot surface roughening treatment is applied to the joining portion of the first metal separator 14 beforehand in an attempt to improve the joining strength. Further, a flat portion surrounding the first oxygen-containing gas flow field 26 is formed over the entire outer periphery of the first metal separator 14. It should be noted that the second metal separator 18 have the same structure.

Then, in a state where the heating rod 94 is heated to a predetermined temperature, a predetermined pressure is applied to the surface 14b opposite to the contact surface (surface 14a) which contacts the first resin frame member 58 of the first metal separator 14, i.e., applied to a heating portion 96a. Therefore, the first resin frame member 58 is heated through the first metal separator 14, and the first resin frame member 58 is partially melted. Then, by decreasing the temperature of the heating rod 94, the melted portion is solidified to form a welding portion 98a.

As shown in FIG. 1, a plurality of the heating portions 96a are provided at predetermined positions on the surface 14b of the first metal separator 14. Therefore, as shown in FIG. 5, a plurality of the welding portions 98a are formed at predetermined positions between the first metal separator 14 and the first resin frame member 58. In particular, the welding portions 98a are provided adjacent to the inlet buffer 62a and adjacent to the outlet buffer 62b. Thus, the first metal separator 14 and the first membrane electrode assembly 16a are joined together in a state where the first metal separator 14 and the first membrane electrode assembly 16a are accurately positioned relative to each other.

In the meanwhile, the second metal separator 18 and the second membrane electrode assembly 16b are welded together in the same manner as described above. As shown in FIG. 1, a plurality of heating portions 96b are provided at predetermined positions on the surface 18a of the second metal separator 18. Therefore, as shown in FIG. 7, a plurality of welding portions 98b are formed at predetermined positions between the second metal separator and the second membrane electrode assembly 16b. In particular, the welding portions 98b are provided adjacent to the inlet buffer 74a and adjacent to the outlet buffer 74b. Thus, the second metal separator 18 and the second membrane electrode assembly 16b are joined together in a state where the second metal separator 18 and the second membrane electrode assembly 16b are accurately positioned relative to each other.

In the first embodiment, in the state where the first metal separator 14 and the first membrane electrode assembly 16a are stacked together, spot heating is applied to the predetermined heating portions 96a from the surface 14b. Thus, the first resin frame member 58 is melted by heating, and the welding portions 98a are formed at the predetermined positions. Therefore, the first metal separator 14 and the first membrane electrode assembly 16a are joined together in the state where the first metal separator 14 and the first membrane electrode assembly 16a are accurately positioned relative to each other, and the first structural body 82 is obtained.

Therefore, even if the first resin frame member 58 which tends to have warpage is used, the first resin frame member 58 can be fixed to the first metal separator 14 reliably. Thus, with simple and economical structure, the first membrane electrode assembly 16a and the first metal separator 14 can be positioned relative to each other accurately and easily. Accordingly, it becomes possible to suppress relative displacement among the components as much as possible.

Further, in the same manner as described above, the second metal separator 18 and the second membrane electrode assembly 16b are joined together in the state where the second metal separator 18 and the second membrane electrode assembly 16b are accurately positioned relative to each other, and the second structural body 84 is obtained. Thus, with simple and economical structure, the second membrane electrode assembly 16b and the second metal separator 18 can be positioned relative to each other accurately and easily. Accordingly, it becomes possible to suppress relative displacement among the components as much as possible.

Further, the power generation unit 12 includes the first structural body 82, the second structural body 84, and the third metal separator 20. In the structure, assembling operation of the power generation unit 12 can be performed simply by stacking the first structural body 82, the second structural body 84, and the third metal separator 20 using knock pins (not shown) inserted into the knock holes 27a, 27b. Accordingly, components within the power generation unit 12, and the components among the power generation units 12 can be positioned each other easily and efficiently.

Operation of the fuel cell 10 will be described below.

Firstly, as shown in FIG. 1, an oxygen-containing gas is supplied to the oxygen-containing gas supply passage 22a, and a fuel gas such as a hydrogen-containing gas is supplied to the fuel gas supply passage 24a. Further, a coolant such as pure water, ethylene glycol, or oil is supplied to the pair of the coolant supply passages 25a.

Thus, some of the oxygen-containing gas from the oxygen-containing gas supply passage 22a flows through the inlet buffer 62a into the first oxygen-containing gas flow field 26 of the first metal separator 14. The remaining oxygen-containing gas from the oxygen-containing gas supply passage 22a flows through the inlet buffer 74a into the second oxygen-containing gas flow field 38 of the second metal separator 18.

As shown in FIGS. 1, 3, and 4, the oxygen-containing gas moves along the first oxygen-containing gas flow field 26 in the horizontal direction indicated by the arrow B, and the oxygen-containing gas is supplied to the cathode 54 of the first membrane electrode assembly 16a. Further, the oxygen-containing gas moves along the second oxygen-containing gas flow field 38 in the direction indicated by the arrow B, and the oxygen-containing gas is supplied to the cathode 54 of the second membrane electrode assembly 16b.

In the meanwhile, as shown in FIG. 1, the fuel gas flows from the fuel gas supply passage 24a into the supply flow grooves 36a, 44a. In the supply flow groove 36a, the fuel gas flows through the inlet buffer 68a, and then, the fuel gas is supplied to the first fuel gas flow field 34 of the second metal separator 18. In the supply flow grooves 44a, the fuel gas flows through the inlet buffer 80a, and the fuel gas is supplied to the second fuel gas flow field 42 of the third metal separator 20.

The fuel gas moves along the first fuel gas flow field 34 in the direction indicated by the arrow B, and the fuel gas is supplied to the anode 56 of the first membrane electrode assembly 16a. Further, the fuel gas moves along the second fuel gas flow field 42 in the direction indicated by the arrow B, and the fuel gas is supplied to the anode 56 of the second membrane electrode assembly 16b.

Thus, in each of the first membrane electrode assembly 16a and the second membrane electrode assembly 16b, the oxygen-containing gas supplied to the cathodes 54, and the fuel gas supplied to the anodes 56 are partially consumed in electrochemical reactions at catalyst layers of the cathodes 54 and the anodes 56 for generating electricity.

Then, the oxygen-containing gas partially consumed at each of the cathodes 54 of the first membrane electrode assembly 16a and the second membrane electrode assembly 16b flows through the outlet buffers 62b, 74b, and the oxygen-containing gas is discharged into the oxygen-containing gas discharge passage 22b. The fuel gas partially consumed at each of the anodes 56 of the first membrane electrode assembly 16a and the second membrane electrode assembly 16b flows through the outlet buffers 68b, 80b, and the fuel gas is discharged into the fuel gas discharge passage 24b.

In the meanwhile, as shown in FIG. 1, the coolant supplied to the pair of left and right coolant supply passages 25a flows into the coolant flow field 32. The coolant from each of the coolant supply passages 25a is supplied to the coolant flow field 32. The coolant temporarily flows inward in the direction indicated by the arrow C, and then, the coolant moves in the direction indicated by the arrow B to cool the first membrane electrode assembly 16a and the second membrane electrode assembly 16b. After the coolant moves outward in the direction indicated by the arrow C, the coolant is discharged into the pair of coolant discharge passages 25b.

Figure 10:
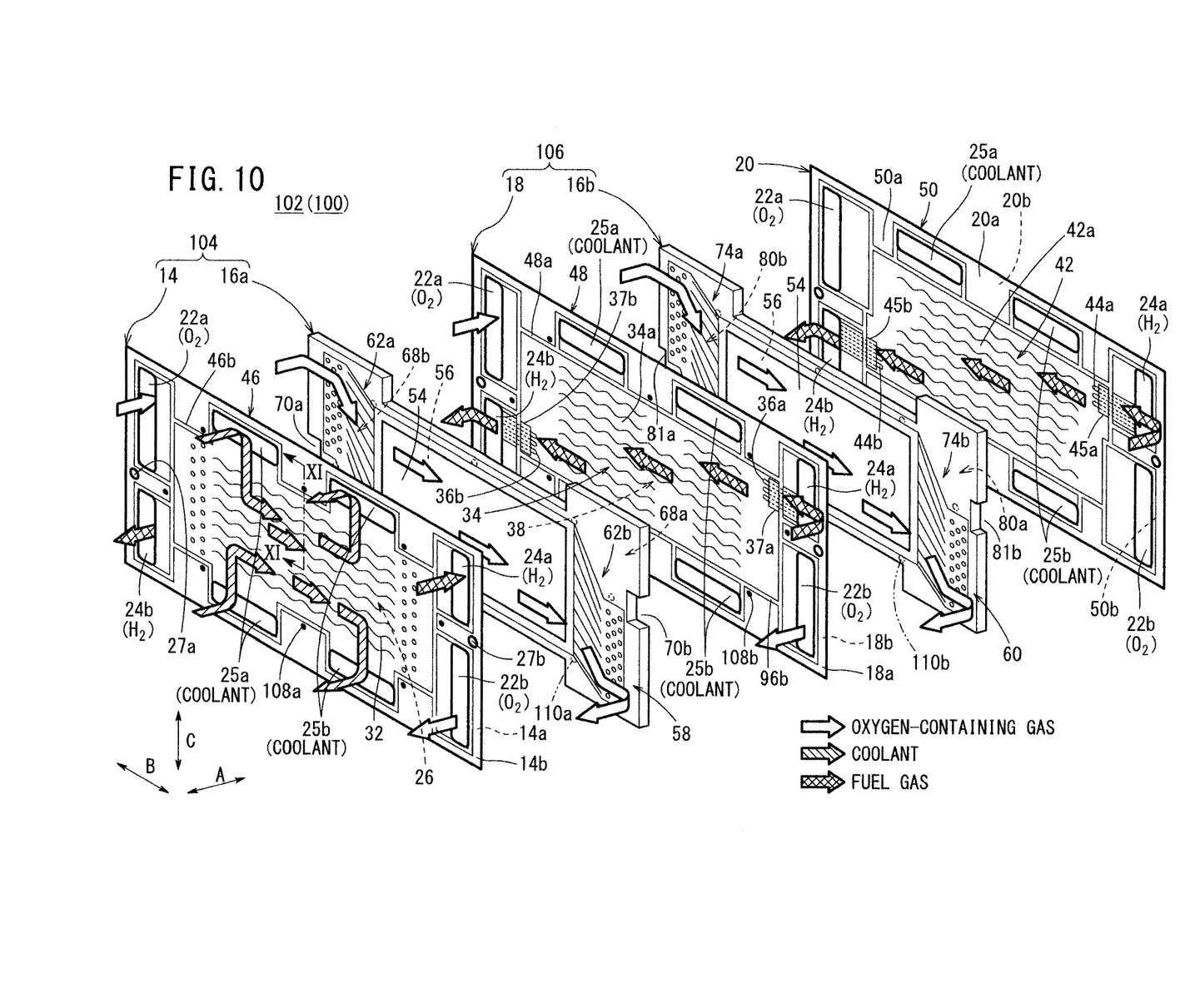
FIG. 10 is an exploded perspective view showing a power generation unit of a fuel cell according to a second embodiment of the present invention.
Figure 11:
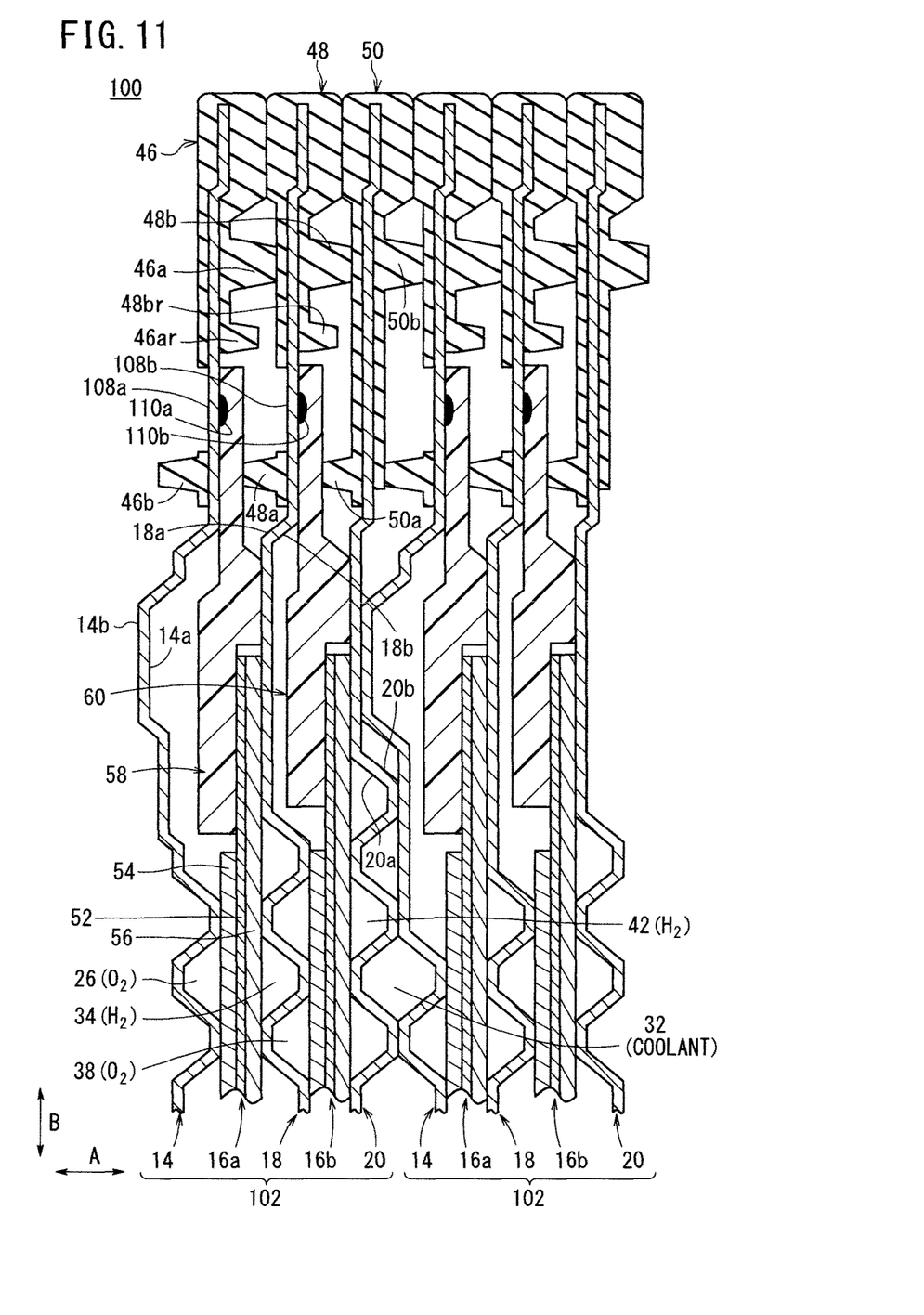
FIG. 11 is a cross sectional view showing the power generation unit, taken along a line XI-XI in FIG. 10.

As shown in FIGS. 10 and 11, a fuel cell 100 according to a second embodiment of the present invention includes a power generation unit 102. A plurality of the power generation units 102 are stacked together in a horizontal direction indicated by an arrow A or in a vertical direction indicated by an arrow C to form a fuel cell stack.

The power generation unit 102 is formed by stacking a first structural body 104, a second structural body 106, and a third metal separator 20 together. The first structural body 104 is formed by welding a first metal separator 14 and a first membrane electrode assembly 16a together, and the second structural body 106 is formed by welding a second metal separator 18 and a second membrane electrode assembly 16b together.

A plurality of heating portions 108a are provided at predetermined positions on a surface 14b of the first metal separator 14. As shown in FIG. 11, each of the heating portions 108a is provided between a first ridge seal 48a as an inner seal member and a first ridge seal 46a as an outer seal member in the direction of the separator surface indicated by the arrow B.

As shown in FIG. 10, a plurality of heating portions 108b are provided at predetermined positions on a surface 18a of the second metal separator 18. As shown in FIG. 11, each of the heating portions 108b is provided between a first ridge seal 50a as an inner seal member and a second ridge seal 48b as an outer seal member in the direction of the separator surface indicated by the arrow B.

A plurality of welding portions 110a are formed at predetermined positions (corresponding to the heating portions 108a) between the first metal separator 14 and the first resin frame member 58. A plurality of welding portions 110b are formed at predetermined positions (corresponding to the heating portions 108b) between the second metal separator 18 and the second membrane electrode assembly 16b.

In the second embodiment, as shown in FIG. 11, the heating portions 108a are provided between the first ridge seal 48a and the first ridge seal 46a in the separator surface direction. In the structure, for example, even if any of the welding portions 110a is damaged, the first ridge seal 48a contacts the first resin frame member 58. Therefore, it is possible to prevent cross leakage of the reactant gases from the damaged welding portion 110a as much as possible. Further, the same advantages as in the case of the first embodiment are obtained.

While the invention has been particularly shown and described with reference to preferred embodiments, it will be understood that variations and modifications can be effected thereto by those skilled in the art without departing from the scope of the invention as defined by the appended claims.

What is claimed is:

1. A method of forming a fuel cell, comprising:
    stacking at least one membrane electrode assembly and at least one metal separator to form a structural body of the fuel cell, the at least one membrane electrode assembly including electrodes and an electrolyte membrane interposed between the electrodes;
    providing a resin frame member in an outer portion of the at least one membrane electrode assembly, wherein the resin frame member overlaps with the outer portion of the at least one membrane electrode assembly;
    heating only one or more heating portions of the at least one metal separator via a heating device at a surface opposite to a contact surface of the at least one metal separator which contacts the resin frame member, wherein the one or more heating portions are located in an outer circumferential portion of the at least one metal separator, in a position in which the at least one metal separator and the resin frame member overlap in a stacked direction, and wherein the one or more heating portions are in a form of a spot, and wherein the one or more heating portions do not cover an entire surface area of the at least one metal separator; and
    welding a welding portion of the resin frame member and the at least one metal separator together at the contact surface opposite to the one or more heating portions which contact the resin frame member by melting, in part, the resin frame member.

2. The method of forming the fuel cell according to claim 1, wherein the at least one metal separator comprises a first metal separator, a second metal separator, and a third metal separator, and wherein the at least one membrane electrode assembly comprises a first membrane electrode assembly and a second membrane electrode assembly, further comprising:
    welding the first metal separator and the first membrane electrode assembly together to form a first structural body of the structural body of the fuel cell;
    welding the second metal separator and the second membrane electrode assembly together to form a second structural body of the structural body of the fuel cell; and
    stacking together the first structural body, the second structural body, and the third metal separator.

3. The method of forming the fuel cell according to claim 1, further comprising:
    providing an inner seal member between one of at least one metal separator and the resin frame member;
    providing an outer seal member outside the resin frame member and between the one of the at least one metal separator and another of the at least one metal separator sandwiching the resin frame member; and
    providing the one or more heating portions between the inner seal member and the outer seal member in a direction of separator surfaces.

4. The method of forming the fuel cell according to claim 3, wherein the at least one metal separator comprises a first metal separator, a second metal separator, and a third metal separator, and the at least one membrane electrode assembly comprises a first membrane electrode assembly and a second membrane electrode assembly, further comprising:
    welding the first metal separator and the first membrane electrode assembly together to form a first structural body of the structural body of the fuel cell;
    welding the second metal separator and the second membrane electrode assembly together to form a second structural body of the structural body of the fuel cell; and
    stacking together the first structural body, the second structural body, and the third metal separator.

* * * * *